United States Patent
Gupta

(10) Patent No.: US 12,282,552 B2
(45) Date of Patent: Apr. 22, 2025

(54) QUANTIFICATION OF CYBER RISK IN APPLICATION WORKLOADS

(71) Applicant: Virsec Systems, Inc., San Jose, CA (US)

(72) Inventor: Satya V. Gupta, Dublin, CA (US)

(73) Assignee: Virsec Systems, Inc., San Jose, CA (US)

( * ) Notice: Subject to any disclaimer, the term of this patent is extended or adjusted under 35 U.S.C. 154(b) by 283 days.

(21) Appl. No.: 17/664,011

(22) Filed: May 18, 2022

(65) Prior Publication Data
US 2023/0004652 A1    Jan. 5, 2023

Related U.S. Application Data

(60) Provisional application No. 63/190,099, filed on May 18, 2021, provisional application No. 63/190,100, filed on May 18, 2021.

(51) Int. Cl.
G06F 21/00    (2013.01)
G06F 21/56    (2013.01)
G06F 21/57    (2013.01)

(52) U.S. Cl.
CPC .......... *G06F 21/563* (2013.01); *G06F 21/562* (2013.01); *G06F 21/566* (2013.01); *G06F 21/577* (2013.01); *G06F 2221/033* (2013.01)

(58) Field of Classification Search
CPC .... G06F 21/566; G06F 21/577; G06F 21/562; G06F 21/563; G06F 2221/033; H04L 63/1433
See application file for complete search history.

(56) References Cited

U.S. PATENT DOCUMENTS

| | | |
|---|---|---|
| 6,321,334 B1 | 11/2001 | Jerger et al. |
| 8,347,267 B2 | 1/2013 | Givoni et al. |
| 9,246,935 B2 | 1/2016 | Lietz et al. |
| 9,418,230 B2 | 8/2016 | Archer et al. |

(Continued)

FOREIGN PATENT DOCUMENTS

| | | |
|---|---|---|
| WO | 2015/007166 A1 | 1/2015 |
| WO | 2016/130372 A1 | 8/2016 |

(Continued)

OTHER PUBLICATIONS

"CAPEC—Common Attack Pattern Enumeration and Classification", (CAPEC(Trademark)), Available on https://capec.mitre.org, Jan. 2, 2022, 2 pages.

(Continued)

*Primary Examiner* — Tri M Tran
(74) *Attorney, Agent, or Firm* — Hamilton, Brook, Smith & Reynolds, P.C.

(57) ABSTRACT

Embodiments assess security vulnerability of an application. An embodiment identifies one or more executables associated with an application and identifies one or more libraries associated with the application. In turn, based on the identified one or more executables and identified one or more libraries, static vulnerability of the application and dynamic vulnerability of the application are determined. Then, an indication of security vulnerability of the application is generated based on the determined static vulnerability and the determined dynamic vulnerability.

17 Claims, 8 Drawing Sheets

(56) References Cited

U.S. PATENT DOCUMENTS

| | | | |
|---|---|---|---|
| 9,501,650 | B2 | 11/2016 | Chess et al. |
| 9,578,060 | B1 | 2/2017 | Brisebois et al. |
| 9,589,560 | B1 | 3/2017 | Vitaladevuni et al. |
| 10,116,681 | B2 | 10/2018 | Cornell et al. |
| 10,354,074 | B2 | 7/2019 | Gupta |
| 10,387,659 | B1 | 8/2019 | Youngberg et al. |
| 10,395,041 | B1 | 8/2019 | Youngberg et al. |
| 10,447,730 | B2 | 10/2019 | Gupta |
| 10,467,419 | B1 | 11/2019 | Youngberg et al. |
| 10,963,565 | B1 * | 3/2021 | Xu ............ G06F 21/55 |
| 11,615,061 | B1 | 3/2023 | Malik et al. |
| 11,907,378 | B2 | 2/2024 | Gupta |
| 2003/0074207 | A1 | 4/2003 | Pace et al. |
| 2004/0046785 | A1 | 3/2004 | Keller |
| 2005/0102534 | A1 | 5/2005 | Wong |
| 2007/0199000 | A1 | 8/2007 | Shekhel et al. |
| 2008/0052527 | A1 | 2/2008 | Siedlarz |
| 2009/0119769 | A1 | 5/2009 | Ross et al. |
| 2013/0111595 | A1 | 5/2013 | Amit et al. |
| 2014/0082735 | A1 | 3/2014 | Beskrovny et al. |
| 2014/0082739 | A1 | 3/2014 | Chess et al. |
| 2014/0165192 | A1 | 6/2014 | Zhu et al. |
| 2015/0215332 | A1 | 7/2015 | Curcic et al. |
| 2015/0261653 | A1 | 9/2015 | Lachambre et al. |
| 2015/0309813 | A1 | 10/2015 | Patel |
| 2016/0164891 | A1 | 6/2016 | Satish et al. |
| 2016/0241582 | A1 | 8/2016 | Boia et al. |
| 2017/0270303 | A1 | 9/2017 | Roichman et al. |
| 2017/0288878 | A1 | 10/2017 | Lee et al. |
| 2017/0353434 | A1 | 12/2017 | Al-Saber et al. |
| 2018/0349602 | A1 | 12/2018 | Johns |
| 2019/0138725 | A1 | 5/2019 | Gupta |
| 2019/0286833 | A1 | 9/2019 | Takumi et al. |
| 2020/0004963 | A1 * | 1/2020 | Zheng ............ G06F 21/53 |
| 2020/0042714 | A1 | 2/2020 | Gupta |
| 2020/0065166 | A1 * | 2/2020 | Myneni ............ G06F 9/5061 |
| 2020/0097662 | A1 | 3/2020 | Hufsmith et al. |
| 2020/0134193 | A1 | 4/2020 | Youngberg et al. |
| 2020/0134194 | A1 | 4/2020 | Youngberg et al. |
| 2020/0134195 | A1 | 4/2020 | Youngberg et al. |
| 2020/0167477 | A1 | 5/2020 | Ionescu et al. |
| 2020/0336507 | A1 | 10/2020 | Lee et al. |
| 2021/0086089 | A1 | 3/2021 | Pardeshi et al. |
| 2021/0099483 | A1 | 4/2021 | Shukla |
| 2021/0160273 | A1 | 5/2021 | Choi et al. |
| 2022/0046031 | A1 | 2/2022 | Kaidi |
| 2022/0067174 | A1 | 3/2022 | Gupta |
| 2022/0198025 | A1 | 6/2022 | Gupta et al. |
| 2022/0207151 | A1 | 6/2022 | Gupta |
| 2022/0210180 | A1 | 6/2022 | Gupta |
| 2022/0214928 | A1 | 7/2022 | Gupta et al. |
| 2022/0391506 | A1 | 12/2022 | Gupta |

FOREIGN PATENT DOCUMENTS

| | | | |
|---|---|---|---|
| WO | 2020/026228 | A1 | 2/2020 |
| WO | 2022/047245 | A1 | 3/2022 |
| WO | 2022/147474 | A1 | 7/2022 |
| WO | 2022/147478 | A1 | 7/2022 |
| WO | 2022/155685 | A1 | 7/2022 |
| WO | 2022/155687 | A1 | 7/2022 |
| WO | 2022/246436 | A1 | 11/2022 |
| WO | 2022/246437 | A1 | 11/2022 |
| WO | 2023/133586 | A1 | 7/2023 |

OTHER PUBLICATIONS

"Capec View: Mechanisms of Attack", View ID: 1000, (Version 3.6), Available online https://capec.mitre.org/data/definitions/1000.html, Jan. 2, 2022, 2 pages.

"Configuration Management Database (CMDB)", 2023, 15 pages.

"CWE View: Software Development" View ID: 699, Individual Dictionary Definition (4.6), Available on https://cwe.mitre.org/data/definitions/699.html, Jan. 2, 2022, 2 pages.

"Integrated Risk Management (IRM)", Gartner Glossary, Available on https://www.gartner.com/en/information-technology/glossary/integrated-risk-management-irm, Jan. 2, 2022, 5 pages.

"Javap—The Java Class File Disassembler", Oracle, Java SE Documentation, Available on https://docs.oracle.com/javase/7/docs/technotes/tools/windows/javap.html, Jan. 2, 2022, 3 pages.

"The Shadow Brokers", Wikipedia, Available on https://en.wikipedia.org/wiki/The_Shadow_Brokers, Jan. 2, 2022, 8 pages.

"Windows Print Spooler Remote Code Execution Vulnerability", Security Vulnerability, CVE-2021-34527, Available on https://msrc.microsoft.com/update-guide/vulnerability/CVE-2021-34527#title, Jun. 13, 2023, 1 page.

Caputo, D., et al: "Droids in Disarray: Detecting Frame Confusion in Hybrid Android Apps", Jun. 11, 2019 (Jun. 11, 2019), Advances in Databases and Information Systems; [Lecture Notes in Computer Science; Lect.Notes Computer], Springer International Publishing, Cham, pp. 121-139.

Chen et al., "Automated system change discovery and management in the cloud", IBM Journal of Research and Development, vol. 60, No. 2-3, Mar. 1, 2016, p. 2:1-2:10.

Chen et al., "Detecting and Identifying System Changes in the Cloud via Discovery by Example", 2014 IEEE International Conference on Big Data, Oct. 27, 2014, pp. 90-99.

Chen, Lu., et al, "Research on Mobile Application Local Denial of Service Vulnerability Detection Technology Basec on Rule Matching", 2019 IEEE International Conference on Energy Internet (ICEI), IEEE, May 27, 2019 (May 27, 2019), pp. 585-590.

David Stahl, "What's an RFC and what can they do for me?", Global Knowledge, Available on https://www.globalknowledge.com/us-en/resources/resource-library/articles/whats-an-rfc-and-what-can-they-do-for-me/, Sep. 16, 2009, 2 pages.

International Search Report and Written Opinion received for PCT Patent Application No. PCT/US2021/048077, mailed on Dec. 20, 2021, 11 pages.

International Search Report and Written Opinion received for PCT Patent Application No. PCT/US2021/073197, mailed on Mar. 21, 2022, 10 pages.

International Search Report and Written Opinion received for PCT Patent Application No. PCT/US2021/073201, mailed on Apr. 7, 2022, 10 pages.

International Search Report and Written Opinion received for PCT Patent Application No. PCT/US2022/070236, mailed on Apr. 8, 2022, 15 pages.

International Search Report and Written Opinion received for PCT Patent Application No. PCT/US2022/070240, mailed on Apr. 7, 2022, 17 pages.

International Search Report and Written Opinion received for PCT Patent Application No. PCT/US2022/072416, mailed on Sep. 8, 2022, 13 pages.

International Search Report and Written Opinion received for PCT Patent Application No. PCT/US2022/072417, mailed on Sep. 8, 2022, 15 pages.

Johns, M., et al., "XSSDS: Server-Side Detection of Cross-Site Scripting Attacks", Computer Security Applications Conference, 2008. Acsac, Dec. 8, 2008, pp. 335-344.

Koutroumpouchos, K., et al., "ObjectMap: detecting insecure object deserialization", PCI '19: Proceedings of the 23rd Pan-Hellenic Conference on Informatics, Nov. 28, 2019, pp. 67-72.

Prevelakis et al., "Sandboxing Applications", USENIX, The Advanced Computing Systems Association, Feb. 25, 2019, pp. 1-9.

Secure execution of privileged scripts ED-Darl Kuhn, ip.com, ip.com Inc., West Henrietta, Sep. 18, 2009, XP013134389.

Sun, F., et al., "Client-Side Detection of XSS Worms by Monitoring Payload Propagation", Advances in Databases and Information Systems, Sep. 21, 2009, pp. 539-554.

Xia, M. et al: "Effective Real-Time Android Application Auditing", 2015 IEEE Symposium on Security and Privacy, IEEE, May 17, 2015 (May 17, 2015), pp. 899-914.

"ATT&CK (Registered)", The Mitre, Available online at: <https://attack.mitre.org>, Sep. 14, 2023, 1 page.

(56) References Cited

OTHER PUBLICATIONS

"Welcome to YARA's documentation-yara 4.3.2 documentation" Available online at: <https://yara.readthedocs.io/en/stable/>, retrieved on Sep. 14, 2023, 4 pages.

Dizdar, A., "Why are SAST solutions not always the best option for AST?", Bright, Jan. 22, 2020, 10 pages.

Horvath, M., et al., "Magic Quadrant for Application Secuirty Testing" Gartner Reprint, (33 pages) Apr. 29, 2020, 33 pages, retrieved from https://www.gartner.com/doc/reprints?id=1-1YWZKUB5&ct=200429&st=sb.

Potdar, S., "The Curious Case of False Positives in Application Security", Security Zone, May 13, 2019, 4 pages.

QwietAI "ShiftLeft Achieves Highest Ever SAST Score on OWASP Benchmark", Nov. 1, 2023, 7 pages, retrieved from https://qwiet.ai/news-press/shiftleft-achieves-highest-ever-sast-score-on-owasp-benchmark/.

International Search Report and Written Opinion received for PCT Patent Application No. PCT/US2023/060379, mailed on Apr. 19, 2023, 15 pages.

Yang Ji, "Efficient and refinable attack investigation," A Dissertation Presented to The Academic Faculty, Georgia Institute of Technology, Dec. 2019, pp. 123.

\* cited by examiner

QUANTIFICATION OF CYBER RISK IN APPLICATION WORKLOADS

RELATED APPLICATIONS

This application claims the benefit of U.S. Provisional Application No. 63/190,100, filed on May 18, 2021 and U.S. Provisional Application No. 63/190,099 filed on May 18, 2021. The entire teachings of the above applications are incorporated herein by reference.

BACKGROUND

With each passing day, cyber-attacks are becoming increasingly sophisticated. Attacks are often targeted to exploit specific vulnerabilities. Various methods and tools exist for identifying these vulnerabilities, but these existing methods and tools are inadequate.

SUMMARY

Embodiments provide functionality to assess security vulnerability of applications.

The present disclosure provides a method that first, identifies one or more executables associated with an application and identifies one or more libraries associated with the application. In turn, based on the identified one or more executables and identified one or more libraries, the method determines (i) static vulnerability of the application and (ii) determines dynamic vulnerability of the application. An indication of security vulnerability of the application is then generated based on the determined static vulnerability and the determined dynamic vulnerability.

According to an aspect, identifying one or more executables associated with the application and identifying one or more libraries associated with the application includes searching one or more storage volumes associated with one or more workloads implementing the application to identify one or more packages on the one or more storage volumes. An example implementation identifies the one or more executables and the one or more libraries by evaluating the identified one or more packages.

In another aspect, determining the static vulnerability of the application includes identifying at least one of an application name, package name, and version associated with the identified one or more executables and identified one or more libraries. Such an embodiment searches a database for a vulnerability entry matching the identified at least one application name, package name, and version and determines the static vulnerability to be a vulnerability score associated with the matching vulnerability entry.

In yet another aspect, determining the dynamic vulnerability of the application includes extracting a command line of a process spawned in response to a request to run the application. From among the identified one or more executables and identified one or more libraries associated with the application, one or more active executables and one or more active libraries are determined from the extracted command line. An implementation may determine the dynamic vulnerability by searching a database for a vulnerability entry matching the determined one or more active executables and one or more active libraries and determining the dynamic vulnerability to be a vulnerability score associated with the matching vulnerability entry.

According to an aspect, determining the static vulnerability of the application and determining the dynamic vulnerability of the application includes (i) determining a static application vulnerability score and (ii) determining a dynamic application vulnerability score. Determining the dynamic application vulnerability score may include determining a respective dynamic vulnerability score by evaluating application code loaded into memory utilized by each of one or more workloads implementing the application at runtime and, in turn, aggregating the determined respective dynamic vulnerability scores to determine the dynamic application vulnerability score. Determining the static application vulnerability score may include determining a respective static vulnerability score by evaluating application code stored on memory utilized by each of one or more workloads implementing the application. The determined respective static vulnerability scores may be aggregated to determine the static application vulnerability score.

Generating an indication of security vulnerability of the application based on the determined static vulnerability and the determined dynamic vulnerability may include aggregating the determined static application vulnerability score and the determined dynamic application vulnerability score.

Determining the static vulnerability of the application and determining the dynamic vulnerability of the application may include searching a vulnerability database for one or more vulnerability entries matching the identified one or more executables and the identified one or more libraries. Another aspect of the disclosure creates the vulnerability database by: (i) obtaining vulnerability entries from a plurality of sources, (ii) normalizing the obtained vulnerability entries, and (iii) storing the normalized vulnerability entries in the vulnerability database.

One or more actions may be taken using, or based upon, the generated indication of security vulnerability. In one aspect, the generated indication of security vulnerability is displayed. In another aspect, an alarm is generated in response to the generated indication of security vulnerability being above a threshold. In yet another aspect, at least one of an at risk executable and an at risk library is indicated to a user based on the generated indication of security vulnerability.

The identifying one or more executables, the identifying one or more libraries, the determining static vulnerability, the determining dynamic vulnerability, and the generating may be performed in response to a request to run the application.

The disclosure also provides a system to assess security vulnerability of applications. The system includes a processor and a memory with computer code instructions stored thereon. The processor and the memory, with the computer code instructions, are configured to cause the system to implement any embodiments or combination of embodiments described herein.

Further still, the disclosure provides a computer program product for assessing security vulnerability of applications. The computer program product comprises one or more non-transitory computer-readable storage devices and program instructions stored on at least one of the one or more storage devices. The program instructions, when loaded and executed by a processor, cause an apparatus associated with the processor to assess security vulnerability of applications as described herein.

It is noted that embodiments of the method, system, and computer program product may be configured to implement any embodiments or combination of embodiments described herein.

BRIEF DESCRIPTION OF THE DRAWINGS

The foregoing will be apparent from the following more particular description of example embodiments, as illus

DETAILED DESCRIPTION

A description of example embodiments follows.

Every day, scores of new vulnerabilities in commonly used software get reported into various vulnerability databases such as the National Vulnerability Database. As a result, a production application that was not vulnerable yesterday could easily be considered vulnerable today. With thousands of applications being hosted in production environments, it is difficult to quantify, monitor, and report changes in cyber risk in an enterprise's software infrastructure.

Currently, enterprise information technology uses their favorite vulnerability assessment tools, e.g., scanners, that can leverage agents installed on workloads to look for known vulnerable code installed on the workloads. Unfortunately, this mechanism suffers from several drawbacks. First, existing scanners cannot provide the real cyber risk at runtime. In particular, not all vulnerable code on a workload is running at any given time. Further, existing scanners cannot track risk even as vulnerable processes start and terminate. Also, existing scanners do not have a sense of an application's full geometry. This is particularly true if the application's workloads are spread across several clouds, data centers, and subnets. It is also problematic that existing vulnerability assessment tools need to be run manually and/or on a calendar-based trigger instead of on a continuous basis. Problematically, existing scanners leverage vulnerability databases that can lag real vulnerabilities by as much as ten-days. Existing methods also generate false positives when similar sounding package names cause the wrong application to be picked for vulnerability quantification. In addition to generating false positives, gaps in existing risk scanner technology and the absence of a complete database result in existing functionality providing false negatives.

The foregoing factors undermine the real risk posture that an enterprise is exposed to. Embodiments described herein address the abovementioned shortcomings and allow users to easily quantify the cyber risk of an enterprise on a continuous basis even as a tsunami of new third-party vulnerabilities get disclosed into vulnerability databases every day.

Legacy and Cloud Native Applications

Users have been slowly migrating from legacy or monolith applications to cloud native or microservices-based applications. Under the hoods, as the name suggests, instead of deploying a large monolith application, cloud native, i.e., microservices-based applications, disaggregate the overall functionality of monolith applications into smaller, modular chunks. This disaggregation allows microservices-based applications to be upgraded and patched without deploying the full application all over again. Another advantage of microservices based applications is that a hot microservice can scale independently of the other microservices that are not invoked as much. Scaling the entire monolith application is also not desirable.

Figure 1:
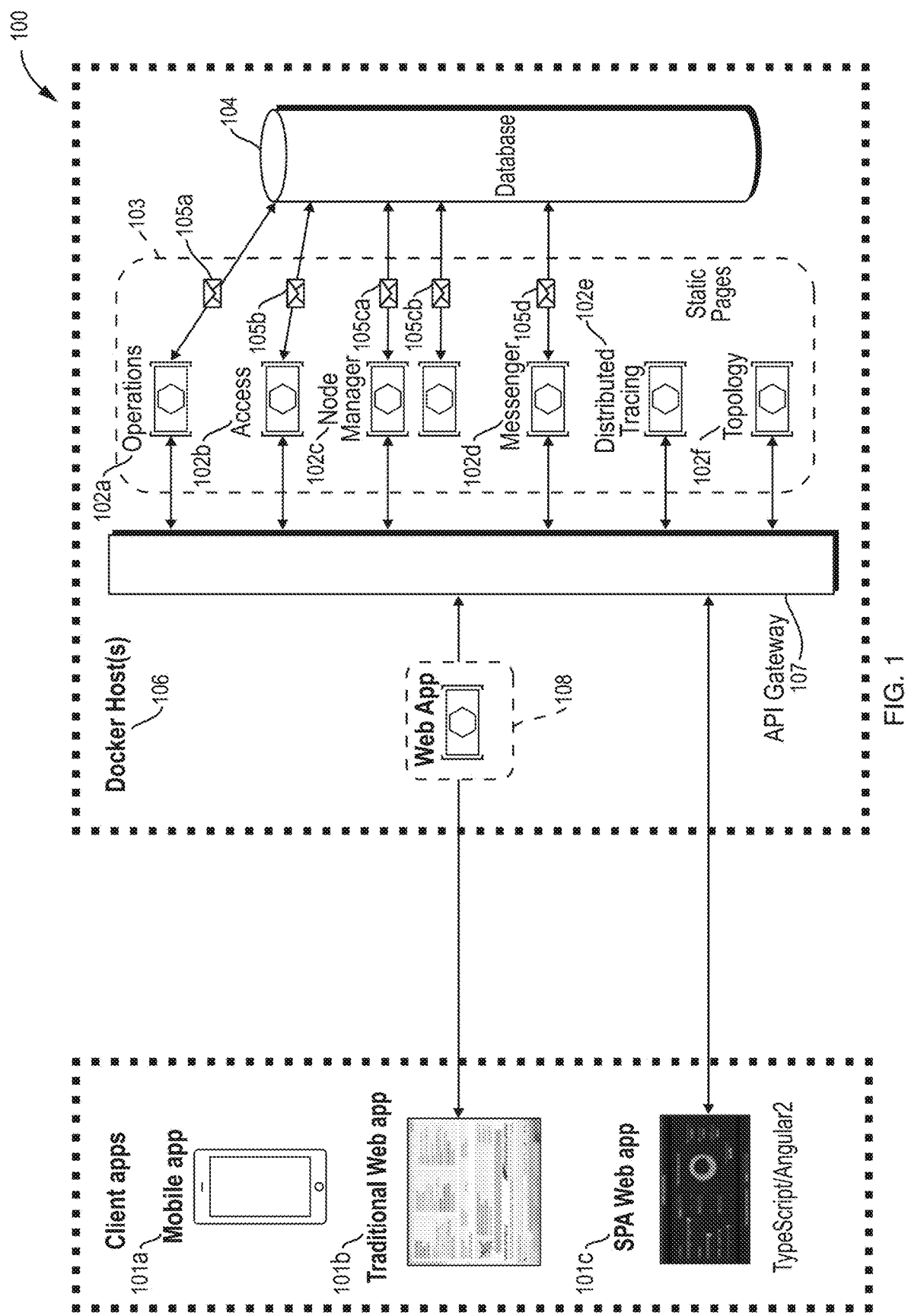
- FIG. 1 is a block diagram illustrating a legacy or monolith service web application that may be analyzed using embodiments.

A legacy, i.e., monolith, application 100 is represented in FIG. 1. In this monolith application 100 represented in FIG. 1, all individual functionality (operations 102*a*, access 102*b*, node manager 102*c*, messenger 102*d*, distributed tracing 102*e*, and topology 102*f*) is packaged in one monolith workload 103. This common functionality 102*a-f* shares a local or remote common database 104 workload as well. As such, each individual function 102*a-d* sends respective data 105*a*, 105*b*, 105*ca*, 105*cb*, and 105*d* to the common database 104. Intercommunication between discrete functionality 102*a-d* in the monolith application 100 is typically performed via a very fast inter-process communication (IPC) mechanism such as shared memory or pipes/fifos. This is possible since the entire functionality 102*a-f* of the workload 103 lives on one host 106.

In operation, the application 100 is accessed by the client applications which include a mobile application 101*a*, traditional web application 101*b*, and single-page web application 101*c*. The mobile application 101*a* and single-page web application 101*c* access the functionality 102*a-f* of the application 100 via the application programming interface (API) gateway 107. The traditional web application 101*b* accesses the application 100 via the web application service 108 and API gateway 107.

The monolith application 100 runs on top of operating system (OS) provided runtime processes and services. In addition, the application 100 may leverage third party binary and interpreted code (executables and libraries) as well as first party code (executables and libraries). All this code, i.e., third party binary code, third party interpreted code, and first party code, may contain vulnerabilities, some of which are known, and others that may be latent or unknown at a given moment in time.

Figure 2:
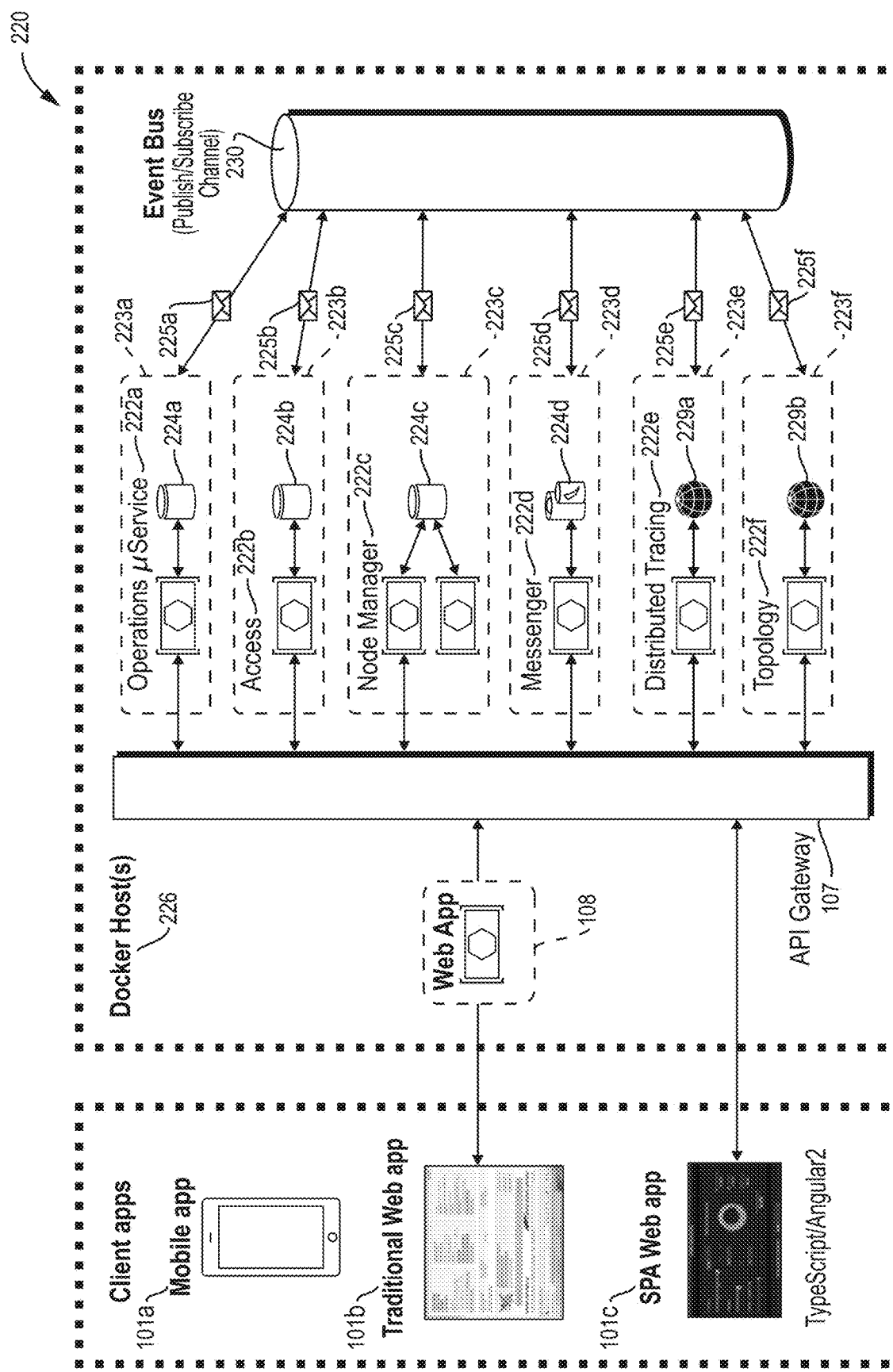
FIG. 2 is a block diagram illustrating a cloud native or microservice web application that may be analyzed using embodiments.

The application 100 can be delivered as a microservices based-application. FIG. 2 illustrates an example application 220, which is a microservices based version of the application 100. As can be seen, the functionality 102*a-f* of the monolith application 100 is broken into individual services 222*a-f* (aka containers) with individual databases 224*a-d* and web connections 229*a-b*. Such web connections 229*a-b* may permit a service 222*e-f* to forward a request to a remote database or to another service via the Internet or other such network connections. Each functionality 222*a-f* can live on one or more host 226 or workload 223*a-f*. The communication between individual microservices 222*a-f* is via messages 225*a-f* that are brokered by an event bus 230. Individual user transactions weave through one or more microservices 222*a-f* and when the full transaction is completed successfully, each service involved in the transaction synchronizes its respective database 224*-d* atomically. Conversely, if the transaction fails, changes to the individual databases 224*a-d* are not committed.

Similar to the application 100, in operation the application 220 is accessed by the client applications, which include a mobile application 101a, traditional web application 101b, and single-page web application 101c. The mobile application 101a and single-page web application 101c access the functionality 222a-f of the application 220 via the application programming interface (API) gateway 107. The traditional web application 101b accesses the application 220 via the web application service 108 and API gateway 107.

How to Evaluate Cyber Risk of an Application?

Software infrastructure, e.g., the software infrastructure utilized by an organization, can be visualized as being segmented at different tiers such as on a per Business Unit basis, per application within that business unit, per private/public cloud provider or data center. The application's infrastructure may further be segmented based on a location within the data center and a subnet in the said data center. Workloads themselves can be individual workloads or a high-availability or load balanced cluster of identical workloads.

Figure 3:
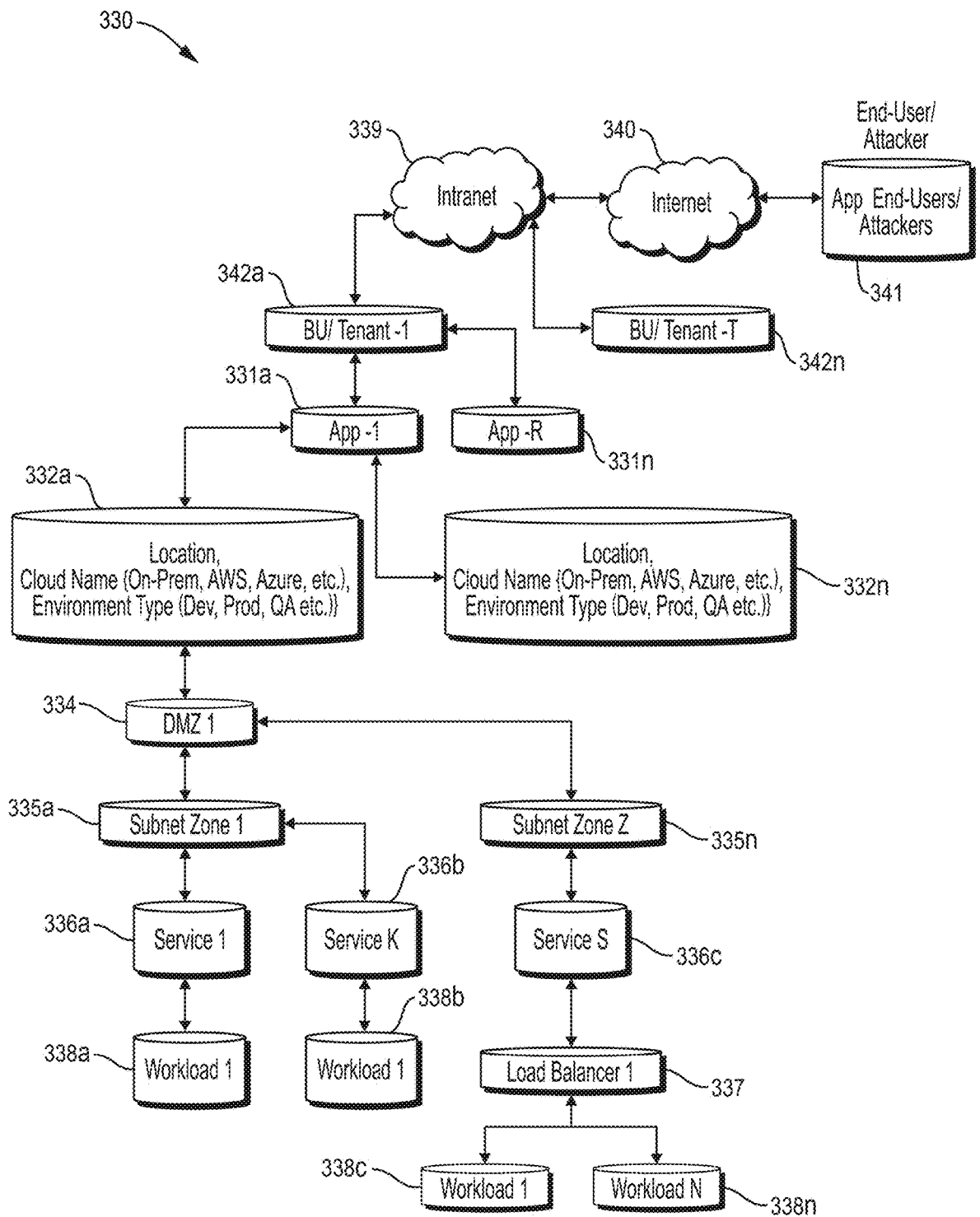
FIG. 3 is a schematic block diagram representation of an example software infrastructure subject to embodiments.

An example of such a visualization is shown in FIG. 3. Particularly, FIG. 3 illustrates software application infrastructure environment 330 of an enterprise in which embodiments for determining application vulnerability as described herein may be employed.

In the environment 330, a workload may include a monolith (e.g., 100) or microservices-based (e.g., 220) software application. Such an application may be installed at additional workloads deployed across a network.

In FIG. 3, applications 331a and 331n, locations 332a and 332n, demilitarized zone (DMZ) 333, subnet zone 335a and subnet zone 335n, services 336a-c, load balancer 337, and workloads 338a, 338b, 338c, and 338n represent network topology of an aspect of the workloads 338a, 338b, 338c, and 338n, such as an application. Depicted in the lowest layer of the network topology are individual workloads 338a, 338b, 338c, and 338n that provide the application functionality. Such individual workloads 338a, 338b, 338c, and 338n may comprise three layers, including an infrastructure layer, a virtualization layer, and a service layer as described hereinbelow in relation to FIG. 4. In such an embodiment, code used within a given workload 338a, 338b, 338c, and 338n can be resident in either the file system or in memory. The network environment 330 may include an intranet 339 connected to the Internet 340 and as such may be accessed by an end-user 341. In some cases, the end-user 341 may be a malicious attacker.

Continuing with respect to FIG. 3, deployed upon the intranet 339 is business logic for respective business units, which may include a first business unit 342a and other business units up to and including a Tth business unit 342n. Such business units 342a and 342n may also be referred to as tenants. Within the business logic for the business units 342a, 342n are software applications 331a, 331n. While only a first application 331a and second application 331n are depicted, the business units 342a and 342n may utilize any number of applications. Each such application 331a, 331n is deployed on at least one location 332a, 332n, which may be a cloud location, on premises location, or other such location known in the art. Within the locations 331a, 331n is deployed a demilitarized zone 334, beyond which are deployed at least one subnet from a first subnet zone 335a to a Zth subnet zone 335n. Various services 336a-c are deployed within the subnets 335a, 335n. In particular, services 336a and 336b are deployed on subnet zone 335a and service 336c is deployed on subnet zone 335n. Within each service 336a-c, are deployed workloads 338a-n. The service 336a is implemented using the workload 338a and the service 336b is implemented using the workload 338b. Likewise, the service 336c is deployed using both the workloads 338c and 338n and the load balancer 337. Upon each workload 338a-n, one or more application service instance (not shown) may be deployed. Each application service instance includes an infrastructure hardware layer, a virtualization layer, and a service, which may include operating system runtime packages, compatible precompiled binary packages, and compatible byte code packages.

Figure 4:
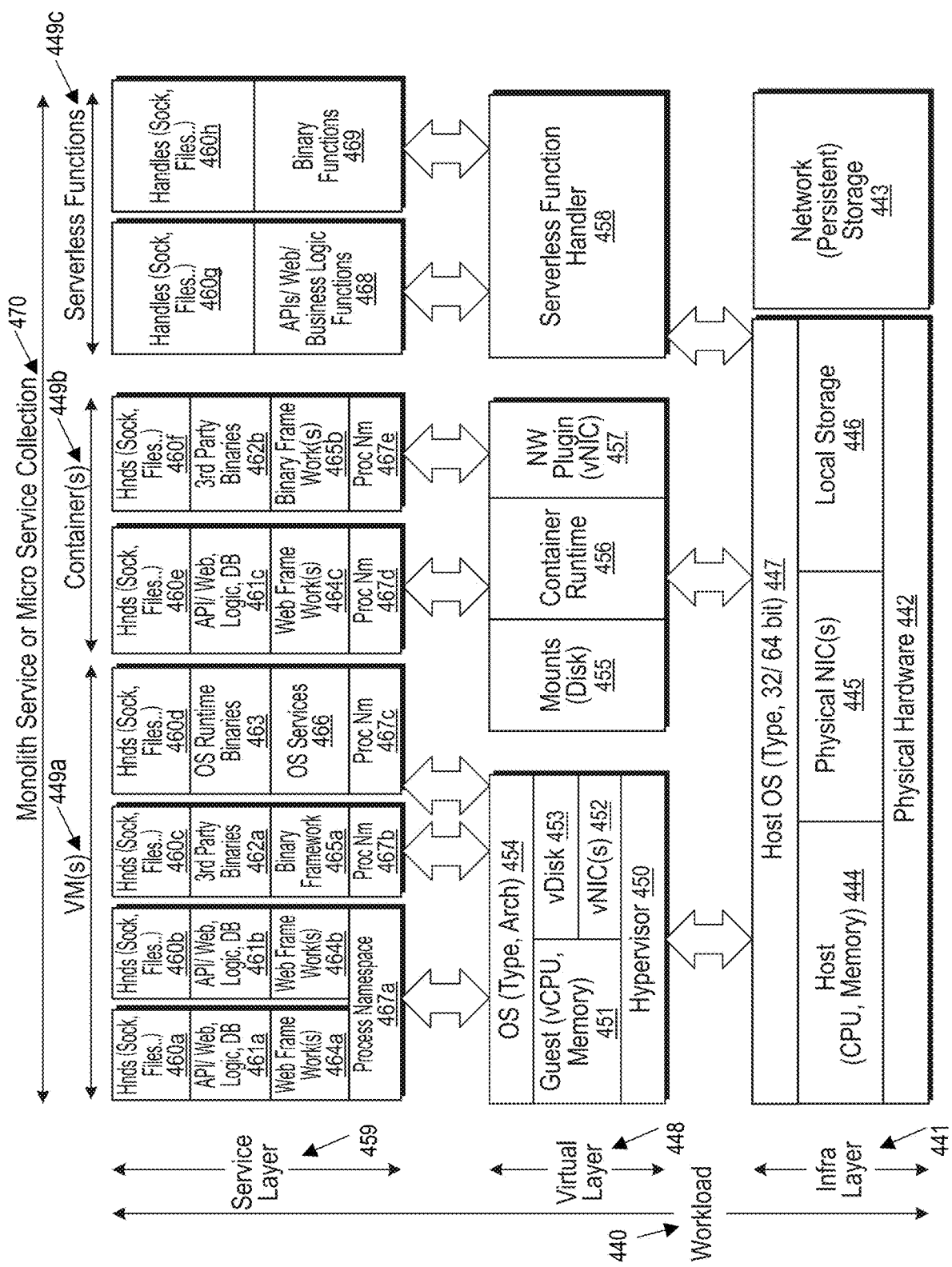
FIG. 4 is a block diagram showing an example workload subject to embodiments.

Individual workloads, e.g., the workloads 338a, 338b, 338c, and 338n are composed of three layers as shown by the example workload 440 in FIG. 4. FIG. 4 illustrates an individual workload 440 that may be deployed upon a network to enable functionality of software such as an application. Such a workload 440 includes an infrastructure layer 441, a virtualization layer 448, and a service layer 459. So configured, such a workload 440 may be referred to as an application service instance (ASI). The infrastructure layer 441 defines attributes such as compute, storage, and host operating system (OS) attributes. This layer can be provided and managed by either a $1^{st}$ or $3^{rd}$ party cloud provider or a private data center provider. The ASI shown in FIG. 4 includes a collection of components comprising a monolith service or a microservice 470. Such a collection 470 includes virtual machines 449a, containers 449b, and serverless functions 449c. The ASI shown in FIG. 4 encompasses a workload 440 deployed on a server.

The lowest layer of the workload 440 is called the compute or infrastructure layer 441. The infrastructure layer 441 includes physical hardware 442, persistent storage 443 available on the network, a host device 444 with a processor and memory, a physical network interface card 445, local storage 446, and a host operating system 447. As such, the layer 441 is composed of not only the compute 442, memory 444, networking 445, and storage (local 446 and remote 443) components, but also the host operating system 447.

The layer in the center of the workload 440 is called the virtualization layer 448. This layer 448 allows users to specify the virtualization technology that isolates the application's business logic from the underlying infrastructure layer 441. There are three virtualization options—the virtual machine 449a, the container 449b, and the serverless option 449c.

The virtualization layer 448 may include a hypervisor 450 and a guest entity 451 that may include a virtual processor and memory. The virtual layer 448 may also include a virtual network interface card 452, a virtual disk 453, and may have an operating system 454 installed thereupon. The virtual layer 448 also includes, for container applications 449b, container mounts 455, container runtime components 456, and network plugin 457. The virtualization layer 448 may also include a serverless 449c function handler 458.

The workload's virtualization layer 448 defines attributes such as a virtualization type, which may be implemented as a bare metal instance, a virtual machine instance 449a, a container instance 449b, or a serverless function 449c. This layer 448 can be provided and managed by either the $1^{st}$ party (where the application and infrastructure are owned and operated by the same entity) or by $3^{rd}$ parties (where the application and infrastructure are owned and operated by different entities).

The top layer of the workload 440 is the service layer 459. In operation, the hypervisor 450 of the virtual layer 448 may, through the operating system 454, connect to one or more virtual machines 449a that are part of the service layer 459. Such virtual machines 449a may include handlers 460a, 460*b*, 460*c*, 460*d*, application programming interface (API) or web logic or databases 461*a*, 461*b*, third-party binaries 462*a*, operating system runtime binaries 463, web frameworks 464*a*, 464*b*, binary framework 465*a*, operating system services 466, and process name spaces 467*a*, 467*b*, 467*c*.

In embodiments operating upon software configured as containers 449*b*, the service layer 459 includes handlers 460*e*, 460*f*, API or web logic or database 461*c*, web frameworks 464*c*, process namespace 467*d*, 467*e*, third-party binaries 462*b*, and binary frameworks 465*b*.

In serverless configurations 449*c*, a serverless function handler 458 interfaces with handles 460*g*, 460*h*, respectively through APIs or web or business logic functions 468, and binary functions 469.

The service layer 459 describes the logical part of the application implemented used the monolith or microservice collection 470 implemented using the workload 440. As can be seen in FIG. 4, the memory subsystem is indicated by a collection of processes 467*a*-*e* that execute code 461*a*-*c*, 462*a*-*b*, 463, 468, and 469 that may be from one or more packages or frameworks 464*a*-*c*, 465*a*-*b*, 466. These frameworks could be web (or API Frameworks) 464*a*-*c*, Binary 465*a*-*b*, or OS Runtime services (aka Host Framework) 466. The processes 467*a*-*e* from the one or more frameworks 464*a*-*c*, 465*a*-*b*, and 466 described above not only load code but also open handles 460*a*-*h* on non-code files such as configuration files, log files, content files etc. Processes 467*a*-*e* can also have handles open on other workloads that form part of the overall end user application.

The service layer 459 contains active code that provides the application's observable functionality. The service layer 459 can be powered by a mixture of OS and OS-provided runtime services (e.g., a host framework), one or more $1^{st}$ or $3^{rd}$ party precompiled executables and libraries (e.g., binary frameworks), and one or more $1^{st}$ or $3^{rd}$ party interpreted code files (e.g., interpreted frameworks).

Automatic and On-Demand Evaluation

In current application implementations, such as those described hereinabove in relation to FIG. 3 and FIG. 4, evaluating cyber risk entails determining the risk from individual workloads. For instance, quantifying the cyber risk for the application 331*a* entails aggregating the cyber risk from individual workloads 338*a*, 338*b*, 338*c*, and 338*n*. Vulnerability databases leverage a common metric called the Common Vulnerability Security Score (CVSS). A CVSS score between 9.0 and 10.0 is considered Critical. A score between 7.0 to 8.9 is considered High. A score between 4.0 and 6.9 is considered Medium. Attacks that are conducted from remote networks are considered more lethal than attacks that are conducted from local networks because it is typically more difficult to conduct the attack from inside the enterprise for fear of being caught. Similarly, attacks that require privileges are considered harder to mount since such attacks involve stealing a specific user's credentials.

Figure 5:
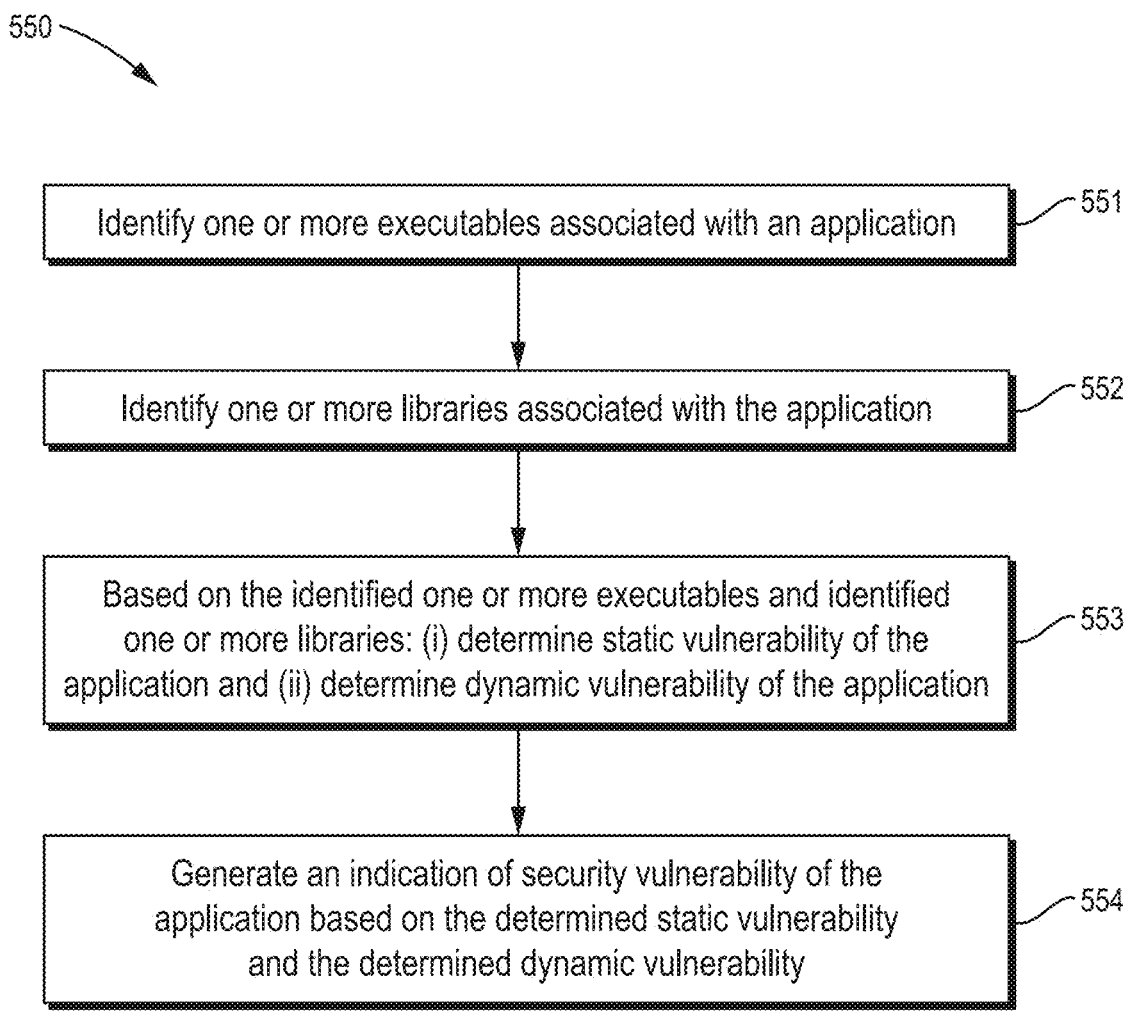
FIG. 5 is a flowchart of a method for assessing security vulnerability of an application according to an embodiment.

Embodiments provide a solution that evaluates both the static and dynamic risk associated with code present on the disk and in the memory subsystems of a workload. FIG. 5 is a flow diagram of a method 550 for determining the risk of an application according to an embodiment. Amongst other examples, the method 550 may be used to determine the risk of: the application 100 described hereinabove in relation to FIG. 1, the application 220 described hereinabove in relation to FIG. 2, the applications 331*a* and 331*n* described hereinabove in relation to FIG. 3, the ASI 470 described hereinabove in relations to FIG. 4, and a collection of ASIs.

The method 550 is computer implemented and, as such, may be implemented using any computing device, or combination of computing devices known in the art. Further, the method 550 may be implemented by the risk computation engine 666 described hereinbelow in relation to FIG. 6.

The method 550 begins, at step 551, by first identifying one or more executables associated with an application and, at step 552, identifying one or more libraries associated with the application. In turn, at step 553 the method 550 determines static vulnerability of the application and determines dynamic vulnerability of the application. In such an embodiment, the static and dynamic vulnerability is determined based on the identified one or more executables (from step 551) and identified one or more libraries (from step 552). The static vulnerability represents the vulnerability of the application by simply being stored, i.e., in a static state or a vulnerability stored on a file system that has not been turned into a process, and the dynamic vulnerability represents the vulnerability at execution. At step 554 an indication of security vulnerability of the application is generated based on the determined static vulnerability and the determined dynamic vulnerability.

According to an embodiment, identifying one or more executables associated with the application at step 551 and identifying one or more libraries associated with the application at step 552 includes searching one or more storage volumes associated with one or more workloads implementing the application to identify one or more packages on the one or more storage volumes. Such an embodiment identifies the one or more executables and the one or more libraries by evaluating the identified one or more packages. The aforementioned searching may identify multiple packages of the application and, then, from amongst the multiple packages, an embodiment examines packages known to have a vulnerability. Libraries and executables may be identified from the vulnerable packages. In an example embodiment, a package of an application known to have a vulnerability may be analyzed by comparing the package with a vulnerability to a package of the application that does not have a vulnerability. These two packages may be compared to identify the differences between the libraries and executables of the two packages. For example, the libraries and executables can be compared to identify the changed libraries and/or executables so as to identify the library or executables where the vulnerability occurred. According to an embodiment, the searched one or more storage volumes may be at any location that is communicatively coupled, or capable of being communicatively coupled to a computing device implementing the method 550. Moreover, the storage volumes can be network based or non-network based.

In an embodiment, determining the static vulnerability of the application at step 553 includes identifying at least one of an application name, package name, and version associated with the identified one or more executables and identified one or more libraries. Such an embodiment searches a database for a vulnerability entry matching the identified at least one application name, package name, and version and determines the static vulnerability to be a vulnerability score associated with the matching vulnerability entry.

In an embodiment, determining the dynamic vulnerability of the application at step 553 includes extracting a command line of a process spawned in response to a request to run the application. From among the identified one or more executables and identified one or more libraries associated with the application, one or more active executables and one or more active libraries are determined from the extracted command line. These active executables and active libraries are the executables and libraries actually being used. The active executables and libraries are in contrast to executables and libraries that are part of an application, but that are not being used as part of a specific execution. To illustrate, consider an example of an application that includes executables A and B. At a specific point in time, only executable A is being used and, in such an implementation, executable A is considered the active executable. In such an example, vulnerabilities associated with executable A are considered in determining the dynamic vulnerability. However, executables associated with executable B are not considered when determining the dynamic vulnerability because executable B is not being employed. In contrast, vulnerabilities associated with both executable A and B are considered when determining static vulnerability.

An implementation of the method 550 may determine the dynamic vulnerability at step 553 by searching a database for a vulnerability entry matching the determined one or more active executables and one or more active libraries and determining the dynamic vulnerability to be a vulnerability score associated with the matching vulnerability entry.

In another embodiment, determining the static vulnerability of the application and determining the dynamic vulnerability of the application at step 553 includes (i) determining a static application vulnerability score and (ii) determining a dynamic application vulnerability score. Determining the dynamic application vulnerability score may include determining a respective dynamic vulnerability score by evaluating application code loaded into memory utilized by each of one or more workloads implementing the application at runtime and, in turn, aggregating the determined respective dynamic vulnerability scores to determine the dynamic application vulnerability score. Determining the static application vulnerability score may include determining a respective static vulnerability score by evaluating application code stored on memory utilized by each of one or more workloads implementing the application. The determined respective static vulnerability scores may be aggregated to determine the static application vulnerability score. In this way, embodiments can aggregate the risk across workloads.

Determining the static vulnerability of the application and determining the dynamic vulnerability of the application at step 553 may also include searching a vulnerability database for one or more vulnerability entries matching the identified one or more executables and the identified one or more libraries. An embodiment of the method 550 does a rigid searching where all characteristics, e.g., name, version, etc., match an entry in the database. This rigid searching helps to eliminate false positives.

Another embodiment of the method 550 creates the vulnerability database used for determining the vulnerability at step 553. An example embodiment creates the vulnerability database by: (i) obtaining vulnerability entries from a plurality of sources, (ii) normalizing the obtained vulnerability entries, and (iii) storing the normalized vulnerability entries in the vulnerability database.

Generating an indication of security vulnerability of the application based on the determined static vulnerability and the determined dynamic vulnerability at step 554 may include aggregating the determined static application vulnerability score and the determined dynamic application vulnerability score. Embodiments of the method 550 may also take one or more actions using, or based upon, the generated indication of security vulnerability. For example, one such embodiment of the method 550 displays the generated indication of security vulnerability. Another embodiment of the method 550 generates an alarm in response to the generated indication of security vulnerability being above a threshold. In yet another embodiment, at least one of an at risk executable and an at risk library is indicated to a user based on the generated indication of security vulnerability. Further, embodiments may provide a ranking of the at risk executables and libraries. For example, such an embodiment may provide a listing from most risky to least risky, so that users can prioritize addressing the at risk executables and libraries.

Embodiments of the method 550 may be also be repeated for multiple applications associated with a user, e.g., a business. When repeated for multiple applications, an embodiment may provide a report highlighting the user's most at risk applications along with the most at risk executables and libraries associated with those applications.

Embodiments of the method 550 may run continuously so as to provide a live indication of security vulnerability. Such a live indication may change as, for instance, an application is being used or not being used. When this occurs, for example, the dynamic vulnerability is nothing when the application is not being used, but when the application is being used the dynamic vulnerability, may for instance, increase. In another embodiment, the method 550, e.g., the identifying one or more executables, the identifying one or more libraries, the determining static vulnerability, the determining dynamic vulnerability, and the generating may be performed in response to a request to run the application.

The step 553 determined static vulnerability and dynamic vulnerability and step 554 generated indication may include a determination/indication for each of multiple vulnerabilities of the application. Embodiments of the method 550 may provide a prioritized list of the vulnerabilities to a user. Further, embodiments of the method 550 may modify the step 553 determined vulnerabilities and step 554 generated indication based on the nature of the vulnerability or vulnerabilities of the application. For example, embodiments may consider a vulnerability that accepts user input to be riskier. An embodiment may also consider a vulnerability that is Internet or intranet facing to be riskier. Similarly, an embodiment may consider a vulnerability to be riskier if exploit code for the vulnerability is known. Further, if a vulnerability is tied to an operating system, the vulnerability may be considered to be riskier because the vulnerability is likely widespread. An embodiment, may also determine if an operating system vulnerability exists, i.e., is installed and/or used. Similarly, an embodiment may also consider the size of the user base. Such an embodiment may treat a vulnerability in an application with a large user base to be riskier than a similar vulnerability in an application with a smaller user base.

As noted above, embodiments of the method 550 may be implemented using any computing device or combination of computing devices known in the art. Further, embodiments can be implemented in an agent-based or agent-less implementation. In an agent-less implementation, embodiments are executed on one or more computing device communicatively coupled, e.g., via an API, to workloads implementing an application. As such, in an agent-less implementation, the one or more computing device executing the method 550 does not need to be installed on the workloads themselves. Instead, a processing device implementing the method 550 can connect to workloads via APIs to implement the functionality described herein. Agentless implementations allow embodiments to quickly assess vulnerability when, for example, a new device is brought online to allow a user to implement an application. An agentless implementation will have already assessed the vulnerability of the one or more workloads implementing the application and the new device simply inherits the risk of the one or more workloads. Thus, such an embodiment can utilize the previously determined vulnerability of the workloads as the vulnerability of the device.

Figure 6:
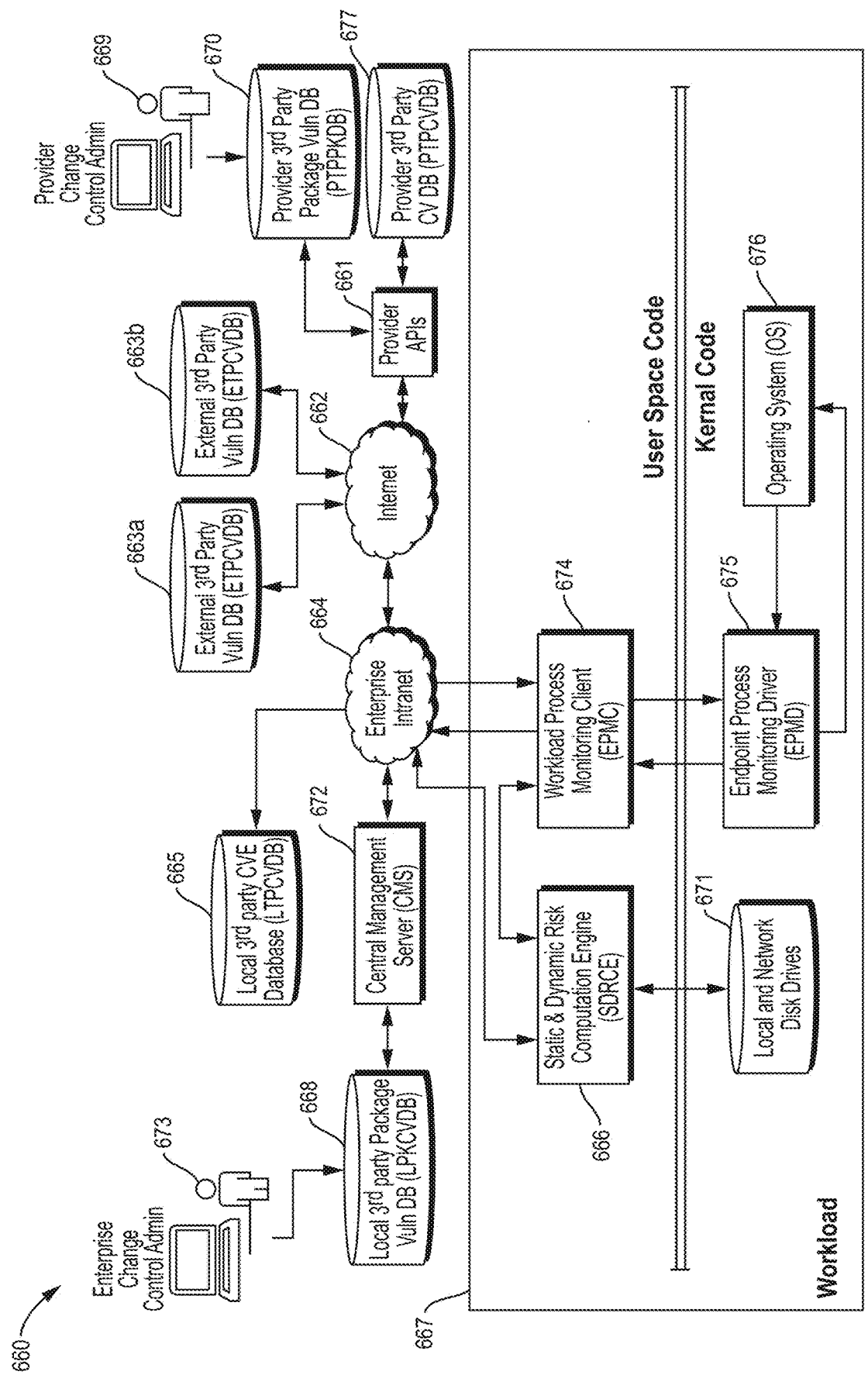
FIG. 6 is a simplified block diagram of a system for assessing static and dynamic cyber risk in a workload according to an embodiment.

FIG. 6 is a block diagram of an example system 660 for evaluating risk according to an embodiment. In the system 660, the overall cyber risk for a workload is considered to be composed of two parts (i) static risk (evaluated from code resident on disk of the workload) and (ii) dynamic risk (evaluated from the risk associated with code loaded in runtime memory).

Static Risk Evaluation

The National Vulnerability Database (NVD) and similar vulnerability databases can be queried with specific application and version information to retrieve individual vulnerabilities, i.e., CVEs associated with the queried application and version. Software including an operating system (OS) kernel and its runtime libraries are delivered as packages such as RPMs, TARs, SEAs, and MSIs, amongst other examples. Each package contains one or more executables and libraries. Each executable and/or library in the package has a unique version associated with it. By extracting executable and library names and associated versions from one or more software packages present on a given workload, it is possible to query a vulnerability database and determine details of any vulnerabilities present in said executable/library.

The system 660 implements executable, library, and associated version querying to evaluate the vulnerability of applications. To implement this functionality, the system 660 provider API 661 obtains, via internet 662, vulnerability information from diverse external third-party common vulnerability databases (ETPCVDBs) 663a-b. The provider API 661 normalizes the data obtained from the diverse ETPCVDBs 663a-b into a common format and downloads, via the intranet 664, the normalized data into the local third-party common vulnerability database (LTPCVDB) 665. Later, as the static and dynamic risk computation engine 666 in each workload 667 parses individual packages present on the workload 667, the system 660 starts associating vulnerabilities with packages. The determined relationships between packages and vulnerabilities are captured in the local third-party package common vulnerability database (LTPKCVDB) 668.

The provider 669 can also preemptively follow a similar process and update the provider third-party package common vulnerability database (PTPCVDB) 670 with any packages the provider 669 can parse with its own resources. The provider 669 can also provide their own vulnerabilities and store those vulnerabilities in the provider third party common vulnerability database (PTPCVDB) 677. Provider API(s) 661 can leverage this information (data stored on the PTPCVDB 670 and PTPCVDB 677) and can synchronize LTPCVDBs, e.g., 665, in individual enterprises.

The presence of the LTPKCVDB 668 makes the job of the static and dynamic risk computation engine 666 significantly easier since the process of culling out the common product names and then searching the database for corresponding vulnerabilities gets done once and then this data can be shared across the entire enterprise.

Each vulnerability extracted as above has a CVSS associated with it. By aggregating CVSSs for the packages present on the workload 667, it is possible to enumerate the static risk score for the workload 667 and further aggregate risk scores from all workloads in applications used by an enterprise. This allows the system 660 to compute the overall risk associated with an application. An enterprise can choose to discontinue use of an application that exceeds a risk threshold.

To evaluate the static risk, the static and dynamic risk computation engine (SDRCE) 666 examines the one or more volumes (local and remote 671) associated with the workload 667 and extracts all the packages present on the disk 671. The SDRCE 666 then decomposes the application name from the executable and package name and version to search through the LTPCVDB 665.

The SDRCE 666 also informs the CMS 672 of the current static risk score even as an end-user 673 updates code on a workstation. When the end-user 673 performs patching, the score may decrease on account of the older vulnerable package being removed. The static risk score can also increase if the patched product or additional code added by the end user 673 has vulnerabilities associated with it.

Dynamic Risk Evaluation

Not all the executables and libraries present in the workload's 667 disk 671 may be loaded in memory and executing at any given moment of time. As such, the vulnerability of an application may vary depending on the code that is loaded and executing. The system 660 accounts for this variation by determining dynamic risk. To determine dynamic risk, the endpoint process monitoring client (EPMC) 674 extracts the command line, provided by the endpoint process monitoring driver (EPMD) 675 of a process as the process is launched by the operating system 676. In turn, the EPMC 674 identifies the main executable from the extracted command line. The EPMC 674 then queries the LPKCVDB 668 using the main executable to determine the runtime risk associated with the workload 667.

Some vulnerabilities are associated with libraries and not the main executable. To account for this, the endpoint process monitoring client 674 also monitors the one or more libraries that load into or unload from process memory at runtime. It is therefore possible for the EPMC 674 to signal the SDRCE 666 to quantify and update the risk associated with the said library dynamically.

From time to time, upon computing the aggregate dynamic risk of the workload, the SDRCE 666 informs the CMS 672 of the determined risk. The CMS 672 can take one or more actions depending on the dynamic risk. For instance, the CMS 672 can display the dynamic risk score and/or generate an alarm if the risk score crosses a threshold.

In embodiments of the system 660, the SDRCE 666 may implement a prioritized methodology for assessing vulnerability. For example, the SDRCE 666 may first check local storage databases, e.g., LPKCVDB 668 and LTPCVDB 665, to determine vulnerability and, if no vulnerability is identified using the local resources, the SDRCE 666 may then check the provider databases PTPPKDB 670 and PTPCVDB 677, before finally checking, external third-party databases ETPCVDB 663a-b.

Advantages

Embodiments have numerous advantages over existing methods for assessing vulnerability. Unlike conventional vulnerability scanners that can simply display a risk score, embodiments can pinpoint packages with the most vulnerabilities in addition to being able to display a risk score. This allows end-users to prioritize addressing risks and patching. Further, existing scanners cannot provide the real cyber risk at runtime. Not all vulnerable code on the workload is running at any given time. Embodiments allow end-users to track vulnerabilities that matter and not vulnerabilities that are dormant.

Existing methods cannot track risk even as vulnerable processes start and terminate. Embodiments can track and monitor the risk at run time and, thus, provide a dynamic vulnerability assessment. Embodiments facilitate tracking and monitoring such risk and thereby empower end-users who can now seek a better deal on their corporate cyber insurance. Also problematically, existing vulnerability assessment scanners do not have a sense for an application's full geometry. This is especially true if the application's workloads are spread across several clouds, data centers, and subnets. Embodiments assess risk based on a full view of an application across its topology. This allows enterprises to evaluate and prioritize remedial action on those applications with increased risk.

Unlike scanners that need to be run manually on a calendar-based trigger instead of on a continuous basis, embodiments can run continuously even as new code is installed or removed or even as processes start and libraries get loaded or unloaded into individual processes. Unlike individual scanners that leverage a vulnerability database that can lag real vulnerabilities by as much as ten-days, embodiments de-risk that by normalizing data from multiple feeds.

Scanners generate false positives when similar sounding package names cause the wrong application to be picked for vulnerability quantification. Embodiments allow local package to CVE databases to be updated and remove any inconsistencies. Further, with individual databases, there may be gaps in the scanner's ability to determine the actual risk. This will cause false negatives in the process of vulnerability enumeration. By sourcing data from multiple vulnerability databases, embodiments reduce or eliminate the cyber risk faced by enterprises.

Computer Support

Figure 7:
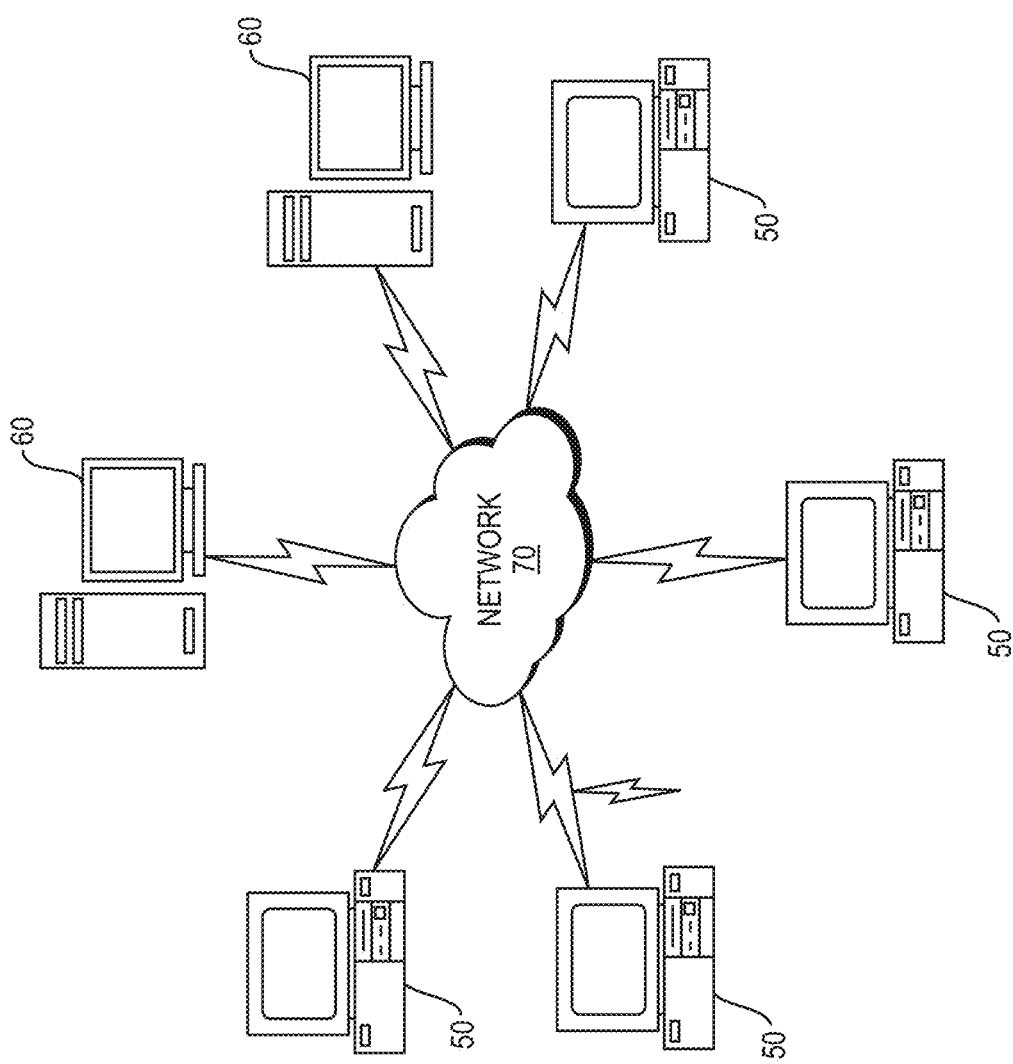
FIG. 7 illustrates a computer network or similar digital processing environment in which embodiments may be implemented.

FIG. 7 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 and/or servers 60 may be configured, alone or in combination, to implement the embodiments described herein, e.g., the method 550, amongst other examples. The server computers 60 may not be separate server computers but part of cloud network 70.

Figure 8:
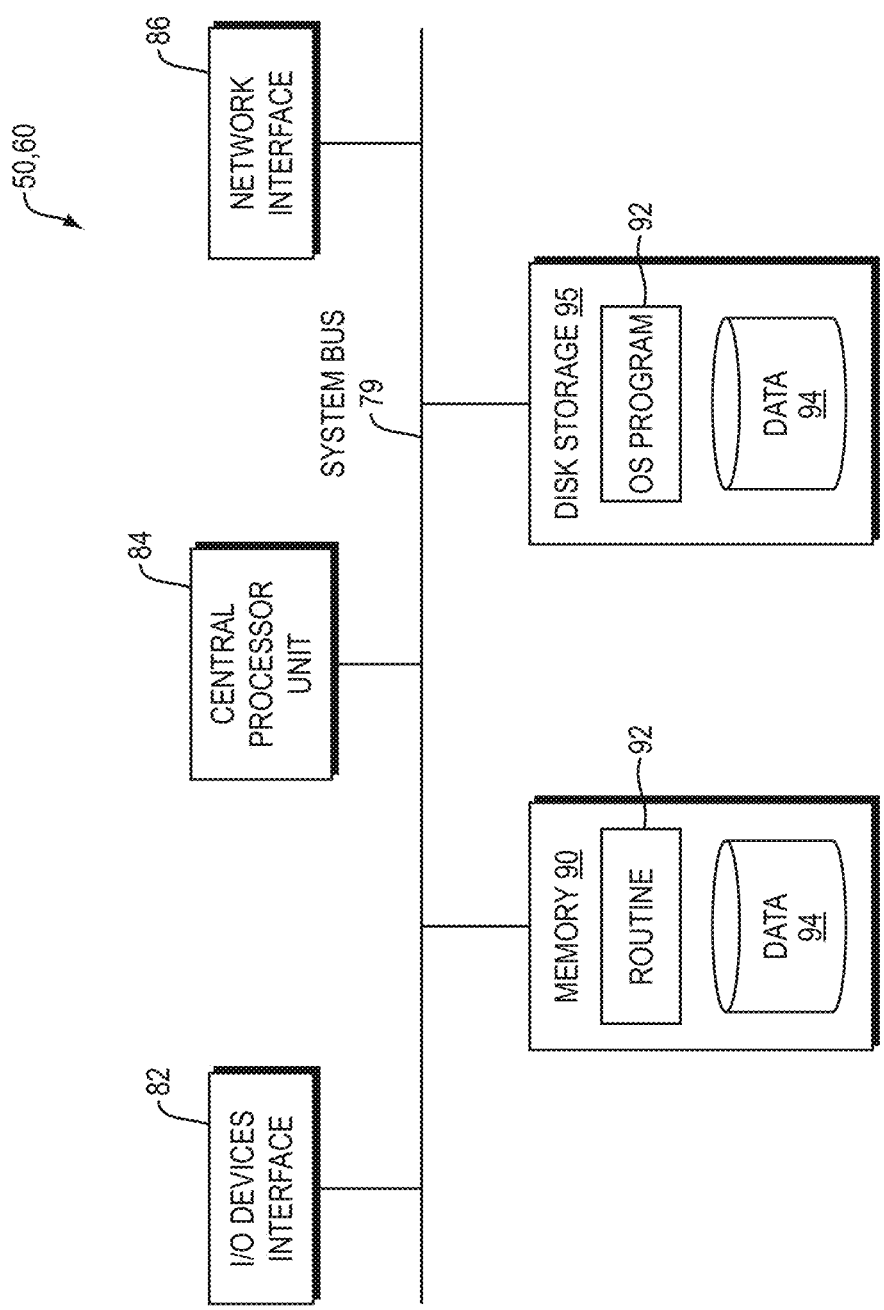
FIG. 8 is a diagram illustrating an example internal structure of a computer in the environment of FIG. 7.

FIG. 8 is a diagram of an example internal structure of a computer (e.g., client processor/device 50 or server computers 60) in the computer system of FIG. 7. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an input/output (I/O) device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 7). Memory 90 provides volatile storage for computer software instructions 92 and data 94 used to implement an embodiment of the present disclosure (e.g., the method 550, amongst others). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of assessing security vulnerability of an application, the method comprising:
   identifying one or more executables associated with an application and identifying one or more libraries associated with the application by: (i) searching one or more storage volumes associated with one or more workloads implementing the application to identify one or more packages on the one or more storage volumes and (ii) identifying the one or more executables and the one or more libraries by evaluating the identified one or more packages;
   based on the identified one or more executables and identified one or more libraries: (i) determining static vulnerability of the application and (ii) determining dynamic vulnerability of the application during operational runtime, wherein determining the dynamic vulnerability includes: (i) extracting a command line of a process spawned in response to a request to run the application and (ii) from among the identified one or more executables and identified one or more libraries associated with the application, determining one or more active executables and one or more active libraries from the extracted command line;
generating an indication of security vulnerability of the application based on the determined static vulnerability and the determined dynamic vulnerability; and
implementing one or more actions based upon the generated indication of security vulnerability.

2. The method of claim 1 wherein determining the static vulnerability of the application includes:
identifying at least one of an application name, package name, and version associated with the identified one or more executables and identified one or more libraries;
searching a database for a vulnerability entry matching the identified at least one application name, package name, and version; and
determining the static vulnerability to be a vulnerability score associated with the matching vulnerability entry.

3. The method of claim 1 wherein determining the dynamic vulnerability comprises:
searching a database for a vulnerability entry matching the determined one or more active executables and one or more active libraries; and
determining the dynamic vulnerability to be a vulnerability score associated with the matching vulnerability entry.

4. The method of claim 1 wherein determining the static vulnerability of the application and determining the dynamic vulnerability of the application includes:
determining a static application vulnerability score; and
determining a dynamic application vulnerability score.

5. The method of claim 4 wherein determining the dynamic application vulnerability score comprises:
determining a respective dynamic vulnerability score by evaluating application code loaded into memory utilized by each of the one or more workloads implementing the application at runtime; and
aggregating the determined respective dynamic vulnerability scores to determine the dynamic application vulnerability score.

6. The method of claim 4 wherein determining the static application vulnerability score includes:
determining a respective static vulnerability score by evaluating application code stored on memory utilized by each of the one or more workloads implementing the application; and
aggregating the determined respective static vulnerability scores to determine the static application vulnerability score.

7. The method of claim 4 wherein generating an indication of security vulnerability of the application based on the determined static vulnerability and the determined dynamic vulnerability includes:
aggregating the determined static application vulnerability score and the determined dynamic application vulnerability score.

8. The method of claim 1 wherein determining the static vulnerability of the application and determining the dynamic vulnerability of the application includes:
searching a vulnerability database for one or more vulnerability entries matching the identified one or more executables and the identified one or more libraries.

9. The method of claim 8 further comprising:
creating the vulnerability database by: (i) obtaining vulnerability entries from a plurality of sources, (ii) normalizing the obtained vulnerability entries, and (iii) storing the normalized vulnerability entries in the vulnerability database.

10. The method of claim 1 further comprising at least one of:
displaying the generated indication of security vulnerability;
generating an alarm in response to the generated indication of security vulnerability being above a threshold; and
indicating at least one of an at risk executable and an at risk library to a user based on the generated indication of security vulnerability.

11. The method of claim 1 wherein the identifying one or more executables, the identifying one or more libraries, the determining static vulnerability, the determining dynamic vulnerability, and the generating is performed in response to a request to run the application.

12. A system for assessing security vulnerability of an application, the system comprising:
a hardware processor; and
a memory with computer code instructions stored thereon, the hardware processor and the memory, with the computer code instructions, being configured to cause the system to:
identify one or more executables associated with an application and identify one or more libraries associated with the application by: (i) searching one or more storage volumes associated with one or more workloads implementing the application to identify one or more packages on the one or more storage volumes and (ii) identifying the one or more executables and the one or more libraries by evaluating the identified one or more packages;
based on the identified one or more executables and identified one or more libraries: (i) determine static vulnerability of the application and (ii) determine dynamic vulnerability of the application during operational runtime, wherein determining the dynamic vulnerability includes: (i) extracting a command line of a process spawned in response to a request to run the application and (ii) from among the identified one or more executables and identified one or more libraries associated with the application, determining one or more active executables and one or more active libraries from the extracted command line;
generate an indication of security vulnerability of the application based on the determined static vulnerability and the determined dynamic vulnerability; and
implement one or more actions based upon the generated indication of security vulnerability.

13. The system of claim 12 wherein, in determining the static vulnerability of the application, the hardware processor and the memory, with the computer code instructions, are configured to cause the system to:
identify at least one of an application name, package name, and version associated with the identified one or more executables and identified one or more libraries;
search a database for a vulnerability entry matching the identified at least one application name, package name, and version; and determine the static vulnerability to be a vulnerability score associated with the matching vulnerability entry.

14. The system of claim 12 wherein, in determining the dynamic vulnerability of the application, the hardware processor and the memory, with the computer code instructions, are configured to cause the system to:
    search a database for a vulnerability entry matching the determined one or more active executables and one or more active libraries; and
    determine the dynamic vulnerability to be a vulnerability score associated with the matching vulnerability entry.

15. The system of claim 12 wherein, in determining the static vulnerability of the application and determining the dynamic vulnerability of the application, the hardware processor and the memory, with the computer code instructions, are configured to cause the system to:
    search a vulnerability database for one or more vulnerability entries matching the identified one or more executables and the identified one or more libraries.

16. The system of claim 15 wherein the hardware processor and the memory, with the computer code instructions, are further configured to cause they system to:
    create the vulnerability database by: (i) obtaining vulnerability entries from a plurality of sources, (ii) normalizing the obtained vulnerability entries, and (iii) storing the normalized vulnerability entries in the vulnerability database.

17. A computer program product for assessing security vulnerability of an application, the computer program product comprising:
    one or more non-transitory computer-readable storage devices and program instructions stored on at least one of the one or more storage devices, the program instructions, when loaded and executed by a processor, cause an apparatus associated with the processor to:
    identify one or more executables associated with an application and identify one or more libraries associated with the application by: (i) searching one or more storage volumes associated with one or more workloads implementing the application to identify one or more packages on the one or more storage volumes and (ii) identifying the one or more executables and the one or more libraries by evaluating the identified one or more packages;
    based on the identified one or more executables and identified one or more libraries: (i) determine static vulnerability of the application and (ii) determine dynamic vulnerability of the application during operational runtime, wherein determining the dynamic vulnerability includes: (i) extracting a command line of a process spawned in response to a request to run the application and (ii) from among the identified one or more executables and identified one or more libraries associated with the application, determining one or more active executables and one or more active libraries from the extracted command line;
    generate an indication of security vulnerability of the application based on the determined static vulnerability and the determined dynamic vulnerability; and
    implement one or more actions based upon the generated indication of security vulnerability.

* * * * *